United States Patent [19]

Sternat

[11] 4,017,829
[45] Apr. 12, 1977

[54] METHOD AND CIRCUIT ARRANGEMENT FOR TESTING DATA PROCESSORS

[75] Inventor: Hugo Sternat, Munich, Germany

[73] Assignee: Siemens Aktiengesellschaft, Munich, Germany

[22] Filed: May 14, 1975

[21] Appl. No.: 577,447

[30] Foreign Application Priority Data

May 14, 1974 Germany .......................... 2423260

[52] U.S. Cl. ............... 340/146.1 C; 340/146.1 BA
[51] Int. Cl.² ......................................... G08C 25/00
[58] Field of Search .......... 340/146.1 C, 146.1 BA, 340/163, 147 C, 147 R

[56] References Cited

UNITED STATES PATENTS

| | | | |
|---|---|---|---|
| 3,252,138 | 5/1966 | Young | 340/146.1 C |
| 3,344,353 | 9/1967 | Wilcox | 340/146.1 C |
| 3,384,873 | 5/1968 | Sharma | 340/146.1 C |
| 3,624,603 | 11/1971 | Delcomyb | 340/163 |
| 3,735,351 | 5/1973 | Macheel | 340/146.1 C |
| 3,868,633 | 2/1975 | Nuese | 340/146.1 BA |

OTHER PUBLICATIONS

B411,633 Jan. 1975, Bonser et al., 340/146.1 C.

Primary Examiner—Charles E. Atkinson
Attorney, Agent, or Firm—Gerald L. Lett

[57] ABSTRACT

A method and apparatus for testing data processing systems having a plurality of peripheral units connected over a bus line system to a central control is described. Check instructions are sent over the bus line in order to obtain predetermined answerbacks so as to check the answerbacks. For checking the address decoding in the peripheral units a first check instruction and the address of a peripheral unit are sent from the central control. The addressed peripheral unit reports back its address to the central control, and the received message in the central control is compared with the sent address. Thereafter, a second check instruction and the same address are sent from the central control. The addressed peripheral unit reports back its address in inverted form, and this received message is processed with the previously sent address. In case of inequality between the first received message and the first sent address and/or inequality between the second received message and the inverted address of a fault is indicated. If a fault is so indicated, the first and second received messages are correlated, bit-by-bit, with the sent address and the sent inverted address. Upon locating a faulty component of a message, that component is compared with addresses of all other peripheral units so as to determine the location of the address decoder causing faulty messages.

8 Claims, 4 Drawing Figures

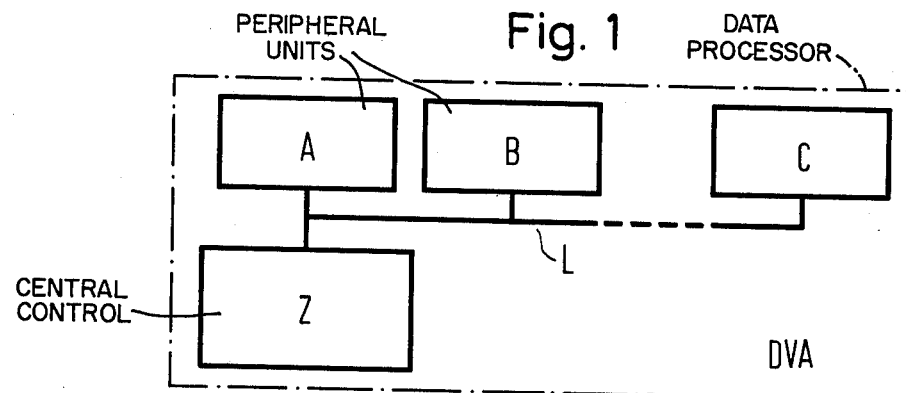
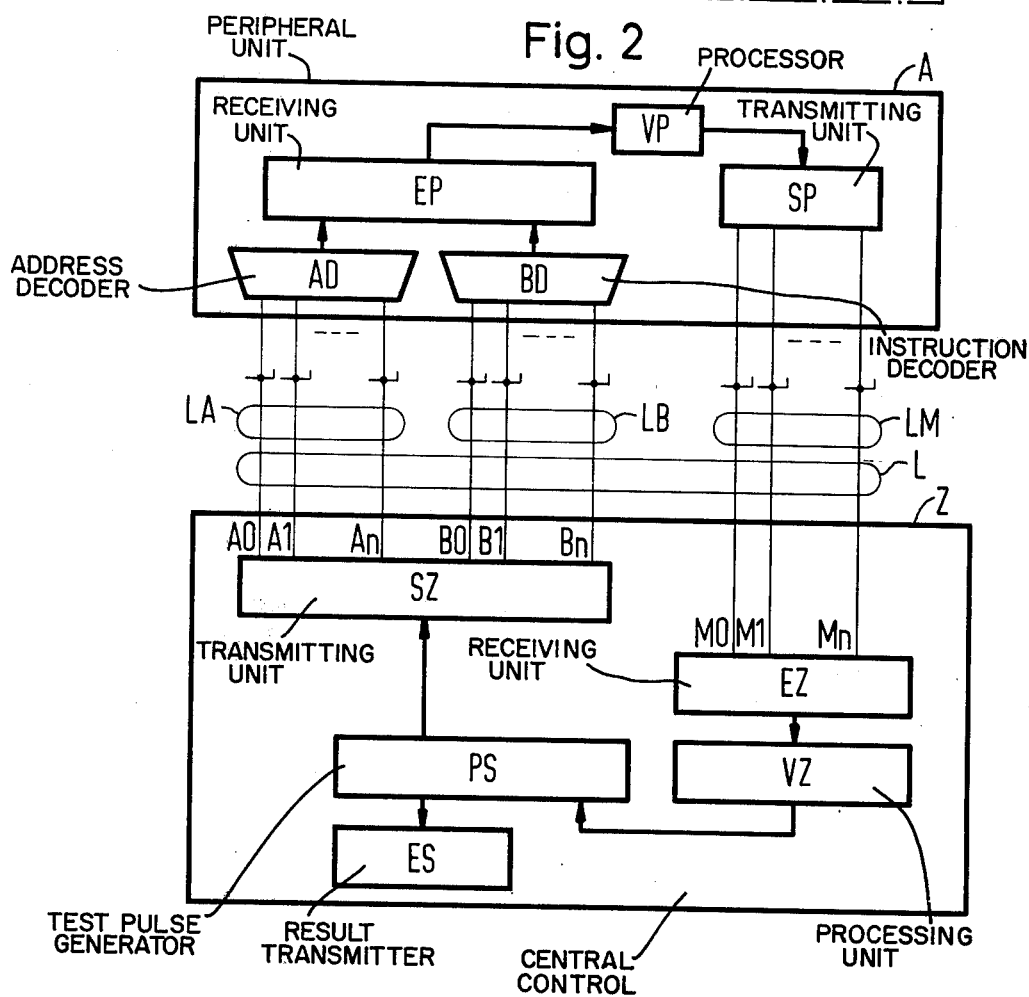

Fig. 4

|        | $Z_0$ | $Z_1$ | $Z_2$ | $Z_3$ | $Z_4$ |
|---|---|---|---|---|---|
| A: | 0 | 0 | 1 | 1 | 1 |
| B: | 0 | 1 | 1 | 1 | 1 |
| A ∧ B: | ∧ | 0 0 | 0 1 | 1 1 | 1 1 | 1 1 |

$= 0\ 0\ 1\ 1\ 1 = Q$

| $\bar{Q}$: | 1 | 1 | 0 | 0 | 0 |
|---|---|---|---|---|---|
| $\bar{A}$: | 1 | 1 | 0 | 0 | 0 |
| $\bar{B}$: | 1 | 0 | 0 | 0 | 0 |

$\bar{A} \wedge \bar{B}$: ∧ 1 1 0 0 0 / 1 0 0 0 0

$= 1\ 0\ 0\ 0\ 0 = R$

| $\bar{R}$: | 0 | 1 | 1 | 1 | 1 |
|---|---|---|---|---|---|

$\bar{A} \vee Q$: ∨ 1 1 0 0 0 / 0 0 1 1 1

$= 1\ 1\ 1\ 1\ 1$ $A \vee R$: ∨ 0 0 1 1 1 / 1 0 0 0 0

$= 1\ 0\ 1\ 1\ 1$ $A \vee \bar{Q}$: ∨ 0 0 1 1 1 / 1 1 0 0 0

$= 1\ 1\ 1\ 1\ 1$ $\bar{A} \vee R$: ∨ 1 1 0 0 0 / 1 0 0 0 0

$= 1\ 1\ 0\ 0\ 0$ $R \vee A$: ∨ 1 0 0 0 0 / 0 0 1 1 1

$= 1\ 0\ 1\ 1\ 1$ $\overline{R \vee A}$: 0 1 0 0 0

$Q \vee \overline{R \vee A}$: ∨ 0 0 1 1 1 / 0 1 0 0 0

$= 0\ 1\ 1\ 1\ 1 = B$

METHOD AND CIRCUIT ARRANGEMENT FOR TESTING DATA PROCESSORS

BACKGROUND OF THE INVENTION

The invention relates to a method and a circuit arrangement for testing data processors. The invention is particularly useful with telephone switching systems having peripheral units connected to a control center over a bus line system.

Program controlled systems having electronic central control units have increasingly been employed in telecommunication switching. Conventional designs of such central control units consist of a plurality of individual units structured into a hierarchy and involve central and peripheral units. It is common practice to connect such peripheral units to the central unit over a bus line system. The peripheral units are all connected in the same manner to such a bus line system. Digital addresses are communicated from the central unit to the address inputs of all the peripheral units over the bus line system to select and activate one of a plurality of peripheral units. The information content of a specified transmitted address code can be screened by means of an address decoder allocated to each individual peripheral unit so that only one of a plurality of peripheral units is activated.

For reasons of operational reliability and in an effort to minimize down time, it is common practice to routinely test all the essential parts of an electronic central control unit. Checks of the bus line systems and of the individual address decoders in the peripheral units are particularly significant, because an error in this area can render the entire central control unit inoperative.

To test a data processor having a central processor and a plurality of storage units which are addressable over a common bus line, present techniques (cf. West German Auslegeschrift 2,048,670) determine if an addressed or a non-addressed storage unit transfers an incorrect answer to a storage read instruction supplied by the processor over the common bus line. To achieve this, a read instruction is transmitted from the central processor over the common bus line so as to obtain a predetermined bit pattern stored in a prespecified storage location of the addressed storage unit. This read instruction is assigned individually to the addressed storage unit. In the processor, a bit pattern specially assigned to the addressed storage unit is compared with the bit pattern obtained through said processor over the bus line in order to deduce an error pattern. With this process, it can be determined if a bit pattern obtained over the bus line contains bits pertaining to identifier bit patterns specially assigned to other storage units. This prior art method thus enables the detection of address errors.

It is an object of this invention to provide a method and circuit arrangement by which double addressings in the periphery of the bus line system can be detected.

Another object is to provide means and method for determining if incorrect answerbacks from the periphery in reaction to test instructions are caused by an incorrectly activated unit or by malfunctions in the addressed unit or in the bus line system.

A further object is to provide a testing method which can be performed fully automatically without deleteriously affecting the normal operation of the central control unit.

Still another object is to provide a method and circuit arrangement in which the allocation of address codes is not subject to any restriction, thus resulting in optimum utilization of the address circuit of the bus line system and flexibility in the design of data processors.

SUMMARY OF THE INVENTION

In accordace with the invention the foregoing and other objects are achieved in that for the testing of the correct address decoding in the peripheral units a first test instruction and the address of a peripheral unit are transmitted from the control center. The latter peripheral unit reports its address back to the control center, and the received first message is compared in the control center with the address sent. Thereafter, a second check instruction and the address are transmitted from the control center. The peripheral unit must then report its inverted address back to the control center, and the second message received is compared in the control center with the address sent last. In the case of inequality between the first received message and the sent address and/or inequality between the second received message and the inverted value of the address a fault is determined through further data processing. In the latter case the messages are correlated by digit position with the sent address and with the sent inverted address, and the equality or inequality of the digit positions of the same logic operation results are examined. The faulty component of a message is ascertained, whereupon the component is compared with the address of all the other peripheral units so as to determine the address of the address decoding causing the faulty message.

Conveniently, a check routine according to the invention is handled such that during the further data processing a first position-by-position operation of the inverted value of the address produced in the control center is carried out with the first message and the digit positions of the first operation result are compared with one another. In case of equality between the digit positions of the first operation result a second position-by-position operation of the address is carried out with the second message, and the digit positions of the second operation result are compared with one another. In case of equality between the digit positions of the second operation result one must deduce the existence of a fault to be determined through other processes. In case of inequality between the digit positions of the first and/or second operation result a third position-by-position operation of the address is carried out with the inverted value of the first message, and the digit positions of the third operation result are compared with one another. In case of inequality between the digit positions of the third operation result, a fourth position-by-position operation of the inverted value of the address is carried out with the second message, and the digit positions of the fourth operation result are compared with one another. In case of inequality between the digit positions of the fourth operation result one must likewise deduce the existence of a fault to be determined through other processes. In case of equality between the digit positions of the third and/or fourth operation result further data processing is carried out, and during this further data processing through position-by-position operation of the address, of the first message and of the second message, the component causing at least one faulty message is determined. A comparison of this component with all the addresses of the other peripheral units connected to the bus line system is carried out, and in the absence of equality between the component causing the faulty messages and one of the addresses, one must again deduce the existence of a fault to be determined through other processes. In case of equality with one of the addresses the peripheral unit causing the faulty message is ascertained.

The invention can be practiced very conveniently if test instructions and messages are transferred in parallel with binary character elements by means of separate data channels within a bus line system. In a circuit arrangement for carrying out the method of the invention, the bus line system connecting the control center with the peripheral units is conveniently divided into several lines: a multiwire address circuit, a multiwire instruction circuit and a multiwire recording trunk.

This present invention is not restricted to application in data processors in which only one central unit is connected to more than one peripheral unit over a single bus line system. Rather it may likewise be applied with appropriately designed circuit arrangements to even fairly large systems having more than one central unit and more than one bus line system, which are connected in the same way to a common group of peripheral units. Moreover, the invention is not limited to only systems wherein the items of information to be transferred by means of the bus line system are composed of binary character elements. Thus, for example, the invention is applicable to systems wherein items of information composed of ternary character elements are used.

An advantageous aspect of the invention is that the kind and location of a fault in the region of the address decoding of the peripheral units connected to a bus line system can be determined automatically. This means that if there is a malfunction in a unit that is not addressed during a check routine, e.g., in the address decoder thereof, the occurrence of a resultant double addressing, i.e., the activation of the deliberately addressed and of the incorrectly addressed unit is detected, and the addresses of these units are determined. The invention makes this possible despite the fact that a bus line system as employed in the example described hereinabove has the inconvenience that various simultaneously applied data signals are mixed as a result of a disjunction. Also of advantage is the fact that the allocation of address codes is not subject to any restrictions. This leads to optimum utilization of the address circuit of the bus line system and to flexibility in data processor design.

BRIEF DESCRIPTION OF THE DRAWINGS

The principles of the invention will be more readily understood by reference to the description of a preferred embodiment constructed to operate according to those principles given hereinbelow in conjunction with the four figures of drawings as described briefly below.

FIG. 1 is a block diagram of a data processor DVA constructed to operate according to the invention.

FIG. 2 is a block-shcematic diagram providing a more detailed illustration of the FIG. 1 embodiment.

FIG. 4 is a truth table for explaining assumed causes of error.

DETAILED DESCRIPTION OF THE DRAWINGS

Figure 3:
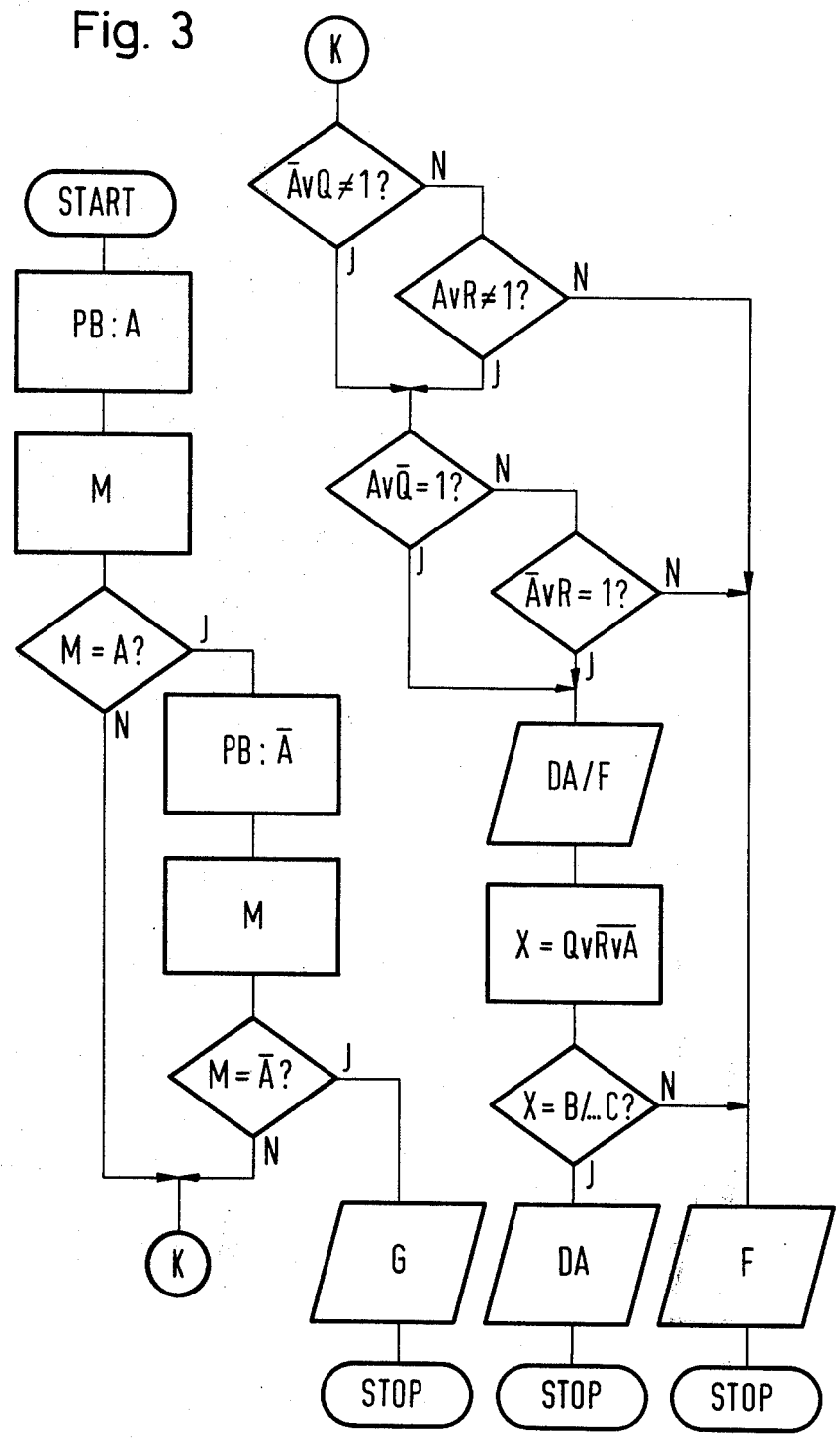
FIG. 3 is a simplified flow diagram showing a method for locating and determining faults according to the invention.

FIG. 1 is a block diagram of a data processor DVA comprising a central control to which more than one peripheral unit is connected by a bus line system. The various individual components of the data processor are of known construction so that structrual details are not given herein, except as necessary to an understanding of the invention which will enable one skilled in the art to practice it. The configuration of and interoperation of such a system are described in "Bell System Technical Journal", 1964, No. 5, page 1964.

All peripheral units A, B, and C are connected in the same way to bus line system L. An address code assigned to the pertinent peripheral unit is sent from the central control Z over the bus line system to all the peripheral units to select and activate one of a number of peripheral units. In this example, it is assumed that all items of information to be transferred with the aid of the bus line system, hence, also the address codes, are each composed of more than one binary symbol.

Referring to FIG. 2, the bus line system L is divided into three lines, i.e., an address circuit LA with wires AO, A1 . . . An, an instruction circuit LB with wires BO, B1 . . . Bn and a data signal trunk LM with wires MO, M1 . . . Mn. All wires of the three lines of the bus line system described are connected in the same manner to all the peripheral units, as can be seen from the multiple symbols entered in the figure.

The internal construction of peripheral unit A is shown in the upper part of the figure as an example for all the peripheral units. The wires of the address circuit are connected to the corresponding inputs of an address decoder AD, the wires of the instruction circuit are connected to the corresponding inputs of an instruction decoder BD, and the wires of the data signal trunk are connected to the corresponding outputs of a transmitting unit SP of the peripheral unit. The address and instruction decoders are of the well known construction illustrated in U.S. Pat. No. 3,665,110 and described in more detail in "Computer Handbook" by Huskey and Korn, 1st Ed., Sec. 14.24 f.f., McGraw-Hill. One of the outputs of the address decoder, i.e., the one corresponding to the individual address of the peripheral unit, is connected to an input of the receiving unit. The outputs of the instruction decoder are likewise connected to corresponding inputs of the receiving unit.

Instructions in the addressed and, hence, activated peripheral unit sent from the central control travel over a connection between the receiving unit and the processing unit VP' of the peripheral unit to the latter processing unit. This task is readily performed by a simple Composable Logic Matrix, as described in the publication "Fairchild Semiconductor Optimos", September, 1972, page 272. Data emerging after processing are coupled over a connection between the processing unit and the transmitting unit SP of the peripheral unit to the peripheral unit. The transmitting unit applies to the binary symbols of the data being transferred to the wires of the data signal trunk which are connected to the corresponding inputs of the receiving unit EZ of the central control. The outputs of the receiving unit are connected to the inputs of the processing unit VZ. In the processing unit, all data processing operations related to the method of the invention, such as logic operations, comparisons, interpretations, etc. are carried out. In conjunction with the test pulse generator PS, the processing unit determines which address codes and test instruction codes shall be sent from the transmitting unit SZ of the central control over the address circuit LA and the instruction circuit LB. The result transmitter ES sends to an external device the result data appearing at the end of a check routine. As indicated, the processor VZ only has the task of accepting decoded instruction and address signals coupled through receiving circuit EP and providing processed results to the test pulse generator PS. The logic arrangement within VZ is fully defined by the flow diagram of FIG. 3 herein and the truth table of FIG. 4 herein. A specific means for performing these operations is described in structural detail in "Computer Handbook", Supra, Section 20.6.

Check routines are handled sequentially for all the peripheral units so as to test the correct address decoding within a peripheral unit and, where necessary, to find the kind and location of the fault.

FIG. 3 is a simplified flow diagram for a check routine of the type discussed above in which the address of the peripheral unit A is employed as an example, FIG. 4 shows various data items made up of the binary digits ZO, Z1 . . . Z4 for the purpose of explaining the necessary data processing operations. This will be explained hereinbelow with reference to several examples.

The problem in the bus line system, as employed in the example, resides in the fact that when transferring correct data signals and concurrently transferring any data from another source due to a fault, there occurs a position-by-position disjunction of the binary symbols of the data. Thus, for example, a binary symbol 1 applied to a wire would be suppressed by a binary symbol 0 likewise applied to the wire, because the voltage potential representing a binary symbol 1 would be lowered by a voltage potential representing a binary symbol 0.

As a result of this position-by-position disjunction of the binary symbols, it is not possible to immediately identify data signals from an unknown source which are sent to the data trunk of a bus line system concurrently with data from an activated peripheral unit.

As stated hereinabove a purpose of the invention is to determine the source of such unknown data, i.e., provide a way to a wrongly addressed and, hence, activated peripheral unit.

A number of checking routines will be explained hereinbelow with reference to FIGS. 2, 3 and 4 detailing the operation of the method according to the invention in the following three cases:

1. Good condition
2. Non-ascertainable error condition
3. Double addressing

1. Good Condition: After initiating the checking routine, the address A is sent from the central control Z to the peripheral unit A over the wires AO, A1 . . . An of the address circuit LA of the bus system L. At the same time, the test instruction PB:A is applied to the wires BO, B1 . . . Bn of the instruction circuit LB. The address decoder AD of the peripheral unit A sends an enabling signal to the receiving unit EP of the peripheral unit, so that the decoded test instruction which is applied at the output of the instruction decoder BD can become operative in the receiving unit EP. The order contained in the test instruction reads: REPORT BACK ADDRESS. The processing unit VP executes this test instruction and applies signals corresponding to the processing result to the inputs of the transmitting unit SP. The latter now sends a message over the wires MO, M1 . . . Mn of the data signal trunk LM of the bus line system L to the receiving unit EZ of the central control Z. The message is processed in the processing unit VZ. The flow diagram of FIG. 3 shows a branchpoint in an appropriate place, where a query is made to discover if the received message M is equal to the sent address. During the data processing procedure needed therefor, the binary symbols of both items of information are compared with one another by digit position. If there is equality between both data items, the peripheral unit A is readdressed, and a check instruction PB:$\overline{A}$ is sent. The order of the check instruction reads: REPORT BACK INVERTED ADDRESS. As described earlier, a message travels over the data signal trunk LM to the receiving unit EZ of the central control Z. Then, it is checked if the received message M is equal to the inverted value $\overline{A}$ of the address. If so, the decision Good Condition G is made, whereupon the check routine is stopped.

2. Non-Ascertainable Error Condition: As described earlier, upon initiation of the check routine, the address A and the check instruction PB:A are sent. Upon receipt of the message M, the latter is compared with the sent address. In the example of operation, both items of information must not be equal so that the check routine is continued over a connector K. A new branchpoint is now added in which a check is made to discover if the position-by-position disjunction of the inverted value $\overline{A}$ with the first faulty message Q yields an operation result with unequal symbols in the binary digits ZO, z1 . . . Z4. FIG. 4 shows for address A the example of a bit pattern having the form of 00111. As mentioned earlier, if more than one message appears concurrently on the wires of the data signal trunk of the bus line system, there occurs a position-by-position disjunction of the binary symbols of the messages.

If the received message M does not agree with the sent address A, one must deduce the existence of a data source which has, likewise, delivered a message, or of a fault of a different kind. The digit 1 in the branchpoint just described and in the following branchpoints has been chosen as a convenient symbol for equality between the binary digits of operation results.

If the binary digits of the first operation result are not identical, i.e., are not equal to 1, a further branchpoint is added in the check routine. Here, it is checked to discover whether a position-by-position disjunction of the address A with the inverted value $\overline{Q}$ of the faulty message Q gives a result with unequal symbols in the binary digits ZO, Z1 . . . Z4. If so, the preliminary decision: DA/F can be made, which means that there is either a double addressing or a not-ascertainable error. An attempt is then made to determine the component X causing the faulty message through the processing method indicated above. In this case, it is not possible, because a second faulty message R, which is required for the processing method, has not been received. The comparisons to be executed in the following branchpoint between the component X causing the faulty message and all the peripheral units B . . . C used in the data processor must hence proceed negatively. Thereafter, the decision non-ascertainable error F can be made, whereupon the check routine is stopped.

2.2 In this example, it must be assumed that the data comparison between the first received message and the sent address proceeds positively. Then follows the retransmission of the address of the peripheral unit A and of the check instruction PB:$\overline{A}$. The received message M is compared in the following branchpoint with the inverted value $\overline{A}$. Both units of information must not be identical in this example so that the check routine is continued over the connector K. The check for inequality between the digits of the operation result must proceed negatively in the next branchpoint, that is, the symbols in the binary digits Z0, Z1 . . . Z4 must be equal. A further branchpoint is added in which the result of the position-by-position disjunction of the address A with the second faulty message R is checked for inequality in the binary digits. If there is no inequality, that is, if equality exists between the symbols of the five binary digits, the decision: non-ascertainable error R can again be made, whereupon the check routine is stopped.

2.3 In this example, initially all the processes proceed as described under 2.2. However, the difference is that now the check or inequality between the symbols in the binary digits (Z0, Z1 . . . Z4) of the result of the position-by-position disjunction of the address A with the second faulty message R proceeds positively. A further branchpoint is now added in the check routine in which a check for equality is made between the binary symbols of the result of the position-by-position disjunction of the address A with the inverted value $\overline{Q}$ of the first faulty message Q. If the reply proves to be negative, a check for equality is made in the following branchpoint between the symbols in the binary digits of the result of the position-by-position disjunction of the inverted value $\overline{A}$ of the address A with the second faulty message. If the answer also proves to be negative, then the decision: non-ascertainable fault F must be made, whereupon the check routine is stopped.

3. Double addressing: This example considers the case of double addressing. As mentioned earlier, FIG. 4 shows various items of information composed of the binary digits Z0, Z1 . . . Z4. A bit pattern having the form 00111 is entered for the address A of the selectively addressed peripheral unit A. The address of the incorrectly co-activated peripheral unit will exhibit the bit pattern 01111. It was stated hereinabove why a position-by-position disjunction of more than one item of information applied concurrently to a line of bus line system occurred. The reason was that a voltage potential representing a binary symbol 0 lowered a voltage potential representing the binary symbol 1. According to the rules of Boolean algebra, such a position-by-position operation must be represented as a conjunction.

FIG. 4 shows how, when a message having the information content of address A is concurrently applied with a message having the information content of address A, the bit pattern for the faulty message 0, i.e., 00111 in this example, will be obtained. The same consideration also applies, where necessary, to a second faulty message R having the bit pattern 10000 in the example used. For the items of information A, B, Q and R, their inverted value (i.e., $\overline{A}, \overline{B}, \overline{Q}$ and $\overline{R}$) are also shown in FIG. 4.

Upon initiation of the check routine, the check instruction PB:A is sent to the periphery. The received message M is compared in the first branchpoint of the check routine with the sent address A. According to the prerequisites set for this example, another (initially unknown) peripheral unit will likewise have been activated with the address A as a result of a fault in the area of its address decoding so that it also delivers to the bus line system a message with the information content of its address; this provides the bit pattern 00111 for said first faulty message (hereinafter called Q) from the bit patterns 00111 for address A and the bit pattern 01111 for address B. Hence, a comparison of the received message M with the sent address A proceeds positively.

Now, a second test instruction PB:$\overline{A}$ is sent with the address A, to which, in accordance with the prerequisites, messages A and B are transferred back from both peripheral units. The order of this second check instruction reads: REPORT BACK INVERTED ADDRESS. FIG. 4 likewise shows how the bit pattern 10000 for the second faulty message R is realized from the bit pattern 11000 of the inverted address $\overline{A}$ and the bit pattern 10000 of the inverted address $\overline{B}$.

The comparison that follows in the check routine between the received message M and the inverted address $\overline{A}$ must proceed negatively, because the two bit patterns differ in the binary digit Z1. The test routine is continued over the connector K to a further branchpoint. Here, a test is made to determine the inequality between the binary digits of the result of the position-by-position disjunction of the inverted address $\overline{A}$ with the first faulty message Q. FIG. 4 shows that the bit pattern of the disjunction has the form 11111. Thus, the binary digits are not identical.

In the following branchpoint a test is made to discover the inequality between the binary digits of the result of the position-by-position disjunction of the address A with the second faulty message R. FIG. 4 shows that the bit pattern of the logical operation has the form 10111. Thus, there is an inequality so that in the further course after the inequality between the binary digits of the result there is a disjunction of the address A with the inverted value $\overline{Q}$ of the first faulty message. This is confirmed by corresponding representation in FIG. 4. Thereupon, the preliminary decision DA/F can be effected. That means that one must deduce the existence of a double addressing DA or of a non-ascertainable error F.

In order to be able to determine if the faulty messages have in fact been caused by a double addressing DA, the faulty component X of the messages must first be discovered through other data processing operations. The operations needed therefor can also be taken from FIG. 4. In the last branchpoint, the component X of the faulty messages obtained in this manner is now compared sequentially with all the other existing addresses in the periphery of the data processor B . . . C. If the component X agrees with one of the addresses (in this example, the address B), the decision DA (i.e., double addressing) can be made. In addition, as apparent from FIG. 4, the address B of the incorrectly co-activated peripheral unit B is determined. Thereupon, the check routine is stopped.

The principles of the invention are described hereinabove in terms of a preferred form of construction and arrangement by which they can be carried out. It is to be noted that the described circuit arrangement for practicing the invention, as well as the specific operations performed, can be modified or changed while remaining within the scope of the invention as defined by the appended claims.

I claim:

1. A method for testing data processing systems having a plurality of peripheral units connected to a central control by means of a bus line and wherein check instructions are sent over the bus line so as to obtain predetermined answerbacks to check these answerbacks, comprising the steps of:

sending from said central control a first check instruction and an address of a given peripheral unit for checking the correctness of address decoding in said peripheral units, communicating, responsive to said first check instruction, the address of the addressed peripheral unit to said central control as a first message, comparing said first message received in said central control with said sent address, sending, thereafter, a second check instruction and said sent address from said central control, communicating, responsive to said second check instruction, said sent address of the addressed peripheral unit in inverted form to said central control as a second message, comparing said second message received in said central control with said sent address in inverted form, indicating a fault if said comparing steps produce the result of inequality between said first message and said sent address and/or inequality between said second message and said second address in inverted form, upon indicaion of a fault, correlating, bit-by-bit, said first and second messages with said sent address and said sent address in inverted form, determining a faulty component in one of said messages on the basis of the equality or inequality of a bit position in said correlated messages and addresses and comparing said faulty component with addresses of others of said peripheral units for determining the address where erroneous address decoding is occurring thereby causing faulty messages.

2. The method defined in claim 1 wherein said correlating step comprises:

logically combining, bit-by-bit, said sent address in inverted form with said first message for a first operation result, in the case of equality of all bit positions of said first operation result, logically combining, bit-by-bit, said sent address with said second message for a second operation result, in the case of equality of all bit positions of said second operation result, indicating a fault, in case of inequality betwen bit positions of said first and/or second operation results, logically combining, bit-by-bit, said sent address and said first message in inverted form for a third operation result, in case of inequality between bit positions of said third operation result, logically combining, bit-by-bit, said sent address in inverted form with said second message for a fourth operation result, in case of inequality between bit positions of said fourth operation result, indicating a fault, and in case of equality between bit positions of said third and/or fourth operation results, locating a faulty component of a message by means of bit-by-bit logical combinations of said sent address, said first message and said second message.

3. The method defined in claim 1 wherein said check instructions and the addresses of said peripheral units are sent in cyclic sequence from said central control.

4. The method defined in claim 1 wherein said check instructions and said messages are communicated by means of separated data channels within said bus line, said check instructions and messages being coupled in parallel to said binary signal components.

5. Apparatus for testing data processing systems having peripheral units connected by means of a bus line to a central control, wherein check instructions are sent over said bus line to obtain predetermined answerbacks comprising:

means for producing and sending from said central control a first check instruction and an address of a given peripheral unit, means for producing and sending a second check instruction and said address of said given peripheral unit from said central control, answerback means in said peripheral units, each said answerback means being operable responsive to said first and second check instructions, respectively, including said address which is the address of the peripheral unit in which is located, to send said address to said central control as a first message and said address in inverted form as a second message, first comparing means in said central control for comparing said first message with said address and for comparing said message with said address and for producing output signals indicating the results of said comparisons, comparison of said first message causing said means for producing and sending said second message to operate, a fault being indicated if said output signal from said comparing means indicates inequality between said first message and said address and/or inequality between said second message and said address in inverted form, correlating means coupled to receive said output signal from said first comparing means and operable responsive to a value of said output signal from said first comparing means indicating a fault for correlating, bit-by-bit, said first and second messages with said address and said adress in inverted form for locating a faulty component of one of said messages and second comparing means for comparing said faulty component as signalled from said correlating means with addresses of others of said peripheral units to determine the address of the peripheral unit wherein address decoding is causing faulty messages.

6. The apparatus defined in claim 5 wherein said bus line is divided into a plurality of lines including a multiwire address circuit, a multiwire instruction circuit and a multiwire data signal trunk.

7. The apparatus defined in claim 5 wherein said means for producing and sending comprises a check pulse generator and a sending unit, upon initiation of a check routine, said check pulse generator receives control instructions from a processing unit in said central control and emits predetermined addresses and check instructions to said sending unit for transmission to an addressed peripheral unit.

8. The apparatus defined in claim 6 wherein said peripheral units each comprise an address decoder connected to said address circuit, an instruction decoder connected to said instruction circuit, a receiving means having inputs connected to outputs of said address decoder and instruction decoder and outputs connected to a processing unit in said peripheral unit, and a sending unit having inputs connected to outputs of said processing unit and outputs connected to said data signal trunk.

* * * * *